United States Patent [19]

Imanishi et al.

[11] Patent Number: 5,163,117
[45] Date of Patent: Nov. 10, 1992

[54] IMAGE TRANSMITTING ELEMENT COMPRISING AN ARRAY OF PHOTO-TRANSMISSIBLE HOLES

[75] Inventors: Hideki Imanishi; Kenjiro Hamanaka, both of Osaka, Japan

[73] Assignee: Nippon Sheet Glass Co., Ltd., Osaka, Japan

[21] Appl. No.: 611,818

[22] Filed: Nov. 13, 1990

[30] Foreign Application Priority Data

Dec. 5, 1989 [JP] Japan ................... 1-315960

[51] Int. Cl.$^5$ ............................. G02B 6/08
[52] U.S. Cl. ....................... 385/120; 355/1; 385/35; 385/147
[58] Field of Search ............ 350/96.10, 96.24, 96.25, 350/96.27; 355/1; 385/33, 35, 115, 116, 120, 147

[56] References Cited

U.S. PATENT DOCUMENTS

| | | | |
|---|---|---|---|
| 2,992,586 | 7/1961 | Upton | 350/96.27 X |
| 2,996,634 | 8/1961 | Woodcock | 350/96.27 X |
| 3,237,039 | 2/1966 | Fyler | 350/96.27 X |
| 3,253,500 | 5/1966 | Hicks, Jr. | 350/96.27 X |
| 4,737,013 | 4/1988 | Wilcox | 350/96.27 |

Primary Examiner—John D. Lee
Attorney, Agent, or Firm—Sughrue, Mion, Zinn, Macpeak & Seas

[57] ABSTRACT

An image transmitting element is disclosed, which comprises: a transparent substrate; photo-transmissible holes one-dimensionally or two-dimensionally formed as an array in the substrate, each of the holes having a substantially cylindrical side surface and at least two substantially semi-spherical surfaces; a photo-absorptive surface formed on at least a part of the cylindrical side surface of the photo-transmissible holes; and a transparent material with which the photo-transmissible holes are filled, the transparent material having a refractive index higher than that of the substrate.

7 Claims, 4 Drawing Sheets

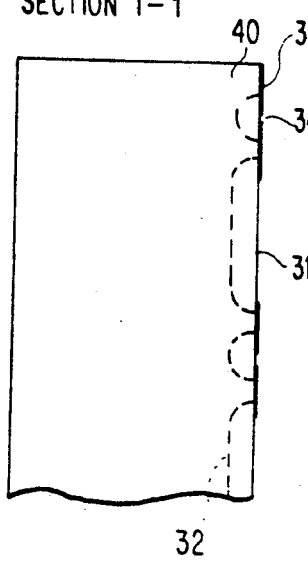
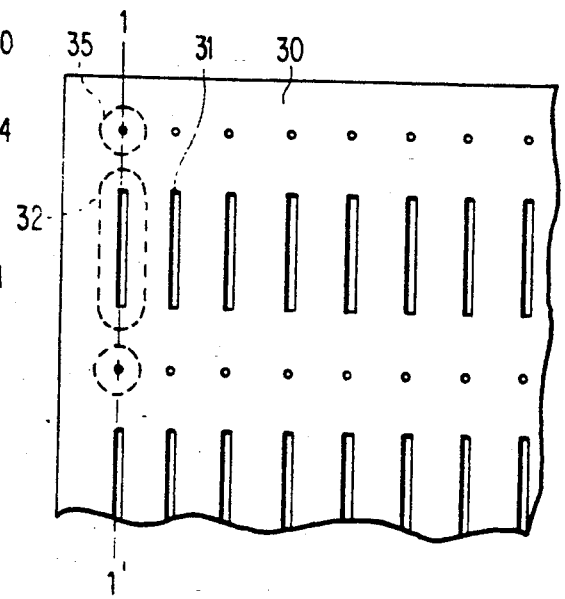
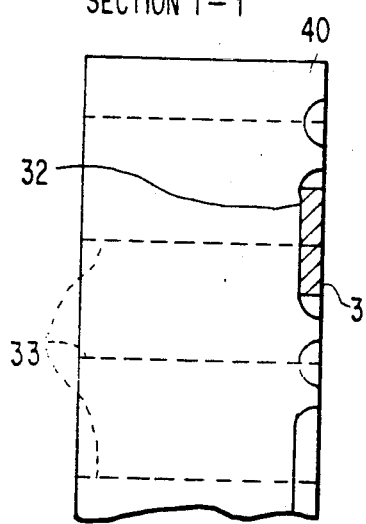
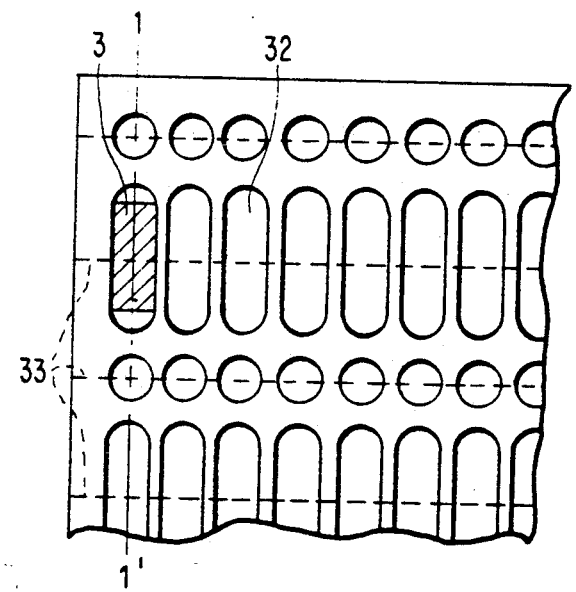
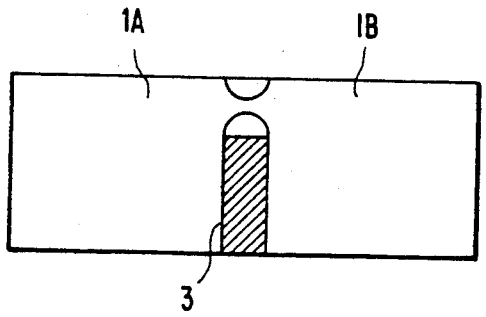

IMAGE TRANSMITTING ELEMENT COMPRISING AN ARRAY OF PHOTO-TRANSMISSIBLE HOLES

FIELD OF THE INVENTION

The present invention relates to an image transmitting element for optically transmitting and focusing one-dimensional or two-dimensional image information, and particularly relates to an image transmitting element which is useful for transmitting and focusing an image of an original document onto a contact type image sensor in a copying machine, a facsimile, an image scanner, or the like, or transmitting and focusing a light signal from a luminous body array onto a photosensitive drum in an LED printer or the like.

BACKGROUND OF THE INVENTION

A lens array (hereinafter abbreviated to "SLA") constituted by a number of parabolic refractive index distributing rod lenses which are arrayed to make their optical axes parallel has been used broadly to focus one-dimensional image information on the surface of an original document onto a contact type image sensor.

Recently, a so-called "perfect contact type image sensor" has been used, which is constituted by a contact type image sensor having light leading windows, so that an illuminating light source placed at the back side of this image sensor illuminates an original document though the light leading window, and an array of photo-detecting portions disposed close to the light leading windows detect reflected light from the original document. In such a case, the contact type image sensor and the original document are disposed so close together that an SLA is not required.

On the other hand, in an LED or liquid crystal printer, an SLA has been used to transmit, onto a photosensitive drum, light information expressed by the flashing of an LED array or the switching of a liquid crystal shutter array.

However, an SLA needs at least about 15 mm as a so-called focal length between a one-dimensional image information surface and a focusing surface. This value limits miniaturization of an apparatus using the SLA.

On the other hand, since the perfect contact type image sensor has no focusing system such as a lens or the like, there has been a problem that image information is faded on an image sensor if the distance between the image sensor and an original document becomes even slightly large. It is therefore necessary to maintain the sensor surface contact with the original document, so that there has been a problem that the sensor surface is apt to be damaged.

SUMMARY OF THE INVENTION

It is therefore an object of the present invention to solve the foregoing problems in the prior art.

It is another object of the present invention to provide an image transmitting element in which no fading of an image signal due to cross talk occurs so that a clear image having high resolution can be obtained accurately.

The present invention relates to an image transmitting element comprising: a transparent substrate; photo-transmissible holes one-dimensionally or two-dimensionally formed as an array in the substrate, each of the holes having a substantially cylindrical side surface and at least two substantially semi-spherical surfaces; a photo-absorptive surface formed on at least a part of the cylindrical side surface of the photo-transmissible holes; and a transparent material with which the photo-transmissible holes are filled, the transparent material having a refractive index higher than that of the substrate.

The image transmitting element according to the present invention is produced so that the photo-transmissible hole array thereof has one-to-one correspondence with a sensor element array of a contact type image sensor or an LED array.

That is, the image transmitting element according to the present invention is used in combination with a contact type image sensor or an LED array, so that one-dimensional or two-dimensional image information of an original document can be accurately transmitted to a sensor element array of the contact type image sensor or light intensity one-dimensional or two-dimensional information of the LED array can be accurately transmitted onto a photosensitive drum of an LED printer.

Other features and advantages of the present invention will be apparent from the following description taken in connection with the accompanying drawings, wherein:

BRIEF DESCRIPTION OF THE DRAWINGS

FIGS. 3A, 3B, 4A, 4B and 5 are views for explaining one embodiment of the process for producing an image transmitting element according to the present invention, in which FIGS. 3A and 3B are a plan view and a transversal section showing the state in which a mask film having an array of slit openings for etching is formed on a substrate, FIGS. 4A and 4B are a plan view and a transversal view showing the state of the substrate after etching, and FIG. 5 is a sectional view showing an image transmitting element obtained by joining a pair of substrates each having grooves to each other and then cutting the joined body of the substrates.

DETAILED DESCRIPTION OF THE PREFERRED EMBODIMENTS

Figure 1:
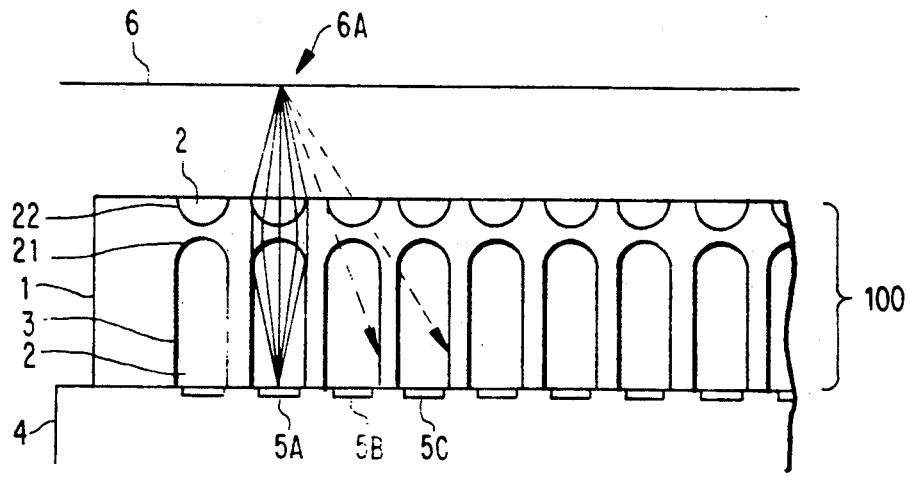
FIG. 1 is a vertical section showing one embodiment of the image transmitting element according to the present invention in the case where the image transmitting element is applied to a contact type image sensor optical system.
Figure 2:
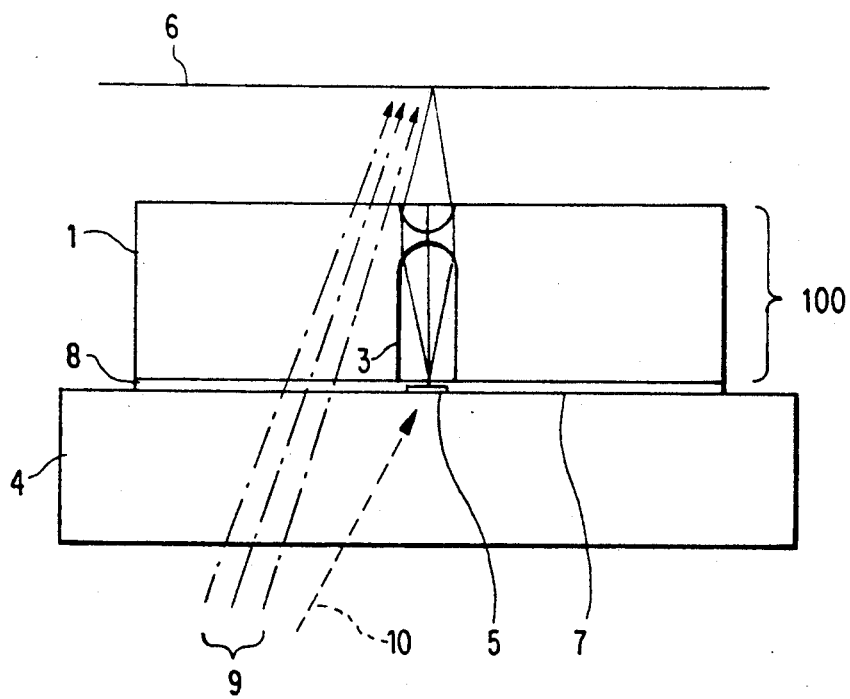
FIG. 2 is a cross section of the image transmitting element shown in FIG. 1.

Referring to FIGS. 1 and 2, description will be made as to one embodiment of the image transmitting element according to the present invention in the case where the image transmitting element is used in combination with a contact type image sensor (hereinafter referred to as "contact sensor"). FIG. 1 is a vertical sectional view showing this embodiment, and FIG. 2 is a sectional view in the direction perpendicular to FIG. 1.

In FIGS. 1 and 2, the reference numeral 100 designates an image transmitting element according to the present invention, which comprises a transparent glass substrate 1. An array of a number of photo-transmissible holes 2 are formed in the glass substrate 1 one-dimensionally at predetermined intervals.

Each of the photo-transmissible holes 2 of the hole array is constituted by a substantially cylindrical side surface, a first substantially semi-spherical surface 21 provided on an upper edge of the side surface, and a second substantially semi-spherical surface 22 disposed as opposed to the first substantially semi-spherical surface 21.

The substantially cylindrical side surface of each of the photo-transmissible holes 2 is coated with a black paint 3 to form a photo-absorptive surface for absorbing light obliquely reflected from an original document as described below. The first and second substantially semi-spherical surfaces 1 and 22 of each of the photo-transmissible holes are not coated with the black paint 3.

Further, each of the photo-transmissible holes 2 is filled with a transparent material having a refractive index higher than that of the glass substrate 1.

The image transmitting element 100 having the above-described constitution is fixed, for example, on the surface of a contact sensor 4 through an adhesive agent. A sensor element array 5, which is constituted by a number of sensor elements 5A, 5B, 5C, etc., is fixed so that each of the photo-transmissible holes 2 and each of the sensor elements 5 of the contact sensor 4 are arranged as opposed to each other so as to have one-to-one correspondence therebetween.

An original document having a surface 6 carrying one-dimensional information is placed close to the image transmitting element 100. The original document surface 6 is irradiated from the back side of the contact sensor 4 which is produced by using a transparent glass substrate. In the contact sensor 4, the sensor element array 5 is formed on a photo-shield layer 7 so that only the original document surface 6 is irradiated with illuminating light 9, and the illuminating light 9 is not directly incident into the sensor element array 5. For example, light rays 10 are shielded by the photo-shield layer 7.

The light reflected from the original document surface (rays illustrated by solid lines in FIGS. 1 and 2) is incident into the photo-transmissible holes through the corresponding second and first substantially semi-spherical surfaces 22 and 21 of the hole, and then focusedly incident into the corresponding sensor elements 5A, 5B, 5C, etc. of the contact sensor.

At this time, each of the substantially semispherical surfaces 21 and 22 acts as a convex lens because each of the photo-transmissible holes 2 is filled with a transparent material having a refractive index higher than that of the glass substrate 1, and therefore the light rays are refracted by each of the substantially semi-spherical surfaces 21 and 22. By the convex lens effect, the light incident into each of the second substantially semi-spherical surfaces 22 is refracted inwards so as to be incident effectively into corresponding one of the light sensor elements 5A, 5B, 5C, etc.

The light obliquely reflected and scattered from the original document in the oblique direction (rays illustrated by a dotted line in FIG. 1) is incident into the adjacent photo-transmissible holes, not the corresponding photo-transmissible hole, and travels against the side surfaces of the adjacent photo-transmissible holes. The side surfaces are coated with the black paint 3, and therefore such obliquely incident light never reaches any of the sensor elements of the sensor array 5.

That is, light (the light rays shown by the solid lines in FIGS. 1 and 2) which is reflected from each of the very small areas on the original document surface 6 positioned just above the corresponding sensor element 5, for example, an area 6A just above the sensor element 5A in FIG. 1, is incident into the corresponding sensor element 5 efficiently through the lens effect of the second and first substantially semi-spherical surfaces 22 and 21. On the contrary, light (the light rays shown by dotted lines in FIG. 1) other than the foregoing light, which is reflected obliquely toward adjacent photo-transmissible holes, is shielded by a photoabsorptive black paint coated portion of the side surfaces of each of the adjacent photo-transmissible holes, and does not reach any of the sensor elements.

Consequently, respective points in a one-dimensional area on the original document surface 6 have one-to-one correspondence with the respective sensor elements of the sensor array 5 of the contact sensor 4 so as to realize clear one-dimensional image transmission with no cross talk light leaking to adjacent picture elements.

In FIG. 2, the reference numeral 8 designates an adhesive layer for bonding the contact sensor 4 and the image transmitting element 100 with each other. The other parts on the surface of the contact sensor such as a wiring pattern, a switching transistor (TFT), a surface protecting coating, etc. are omitted in the drawings for the sake of simplification since these parts have no direct relation with the present invention.

Referring to FIGS. 3 through 5, a preferred embodiment of the process for producing the image transmitting element according to the present invention will be described hereunder.

First, as shown in FIG. 3, the surface of a transparent glass substrate 40 is coated with a mask film 30 composed of a material such as Cr which does not corrode upon contact with a glass etching liquid used in a latter etching step. An array of a number of slit openings 31 and very small substantially circular openings 34 are formed in the mask film 30 at predetermined intervals by use of a well-known photo-lithographic process. The slit openings 31 and the very small openings 34 are formed at predetermined intervals the same as those of the photo-transmissible holes.

By immersing the above-mentioned glass substrate having the mask film into a glass etching liquid having a main component such as fluoric acid, etching starts from the openings 31 and 34 in the mask film so that the glass substrate 40 is etched substantially isotropically from the surface of the glass substrate into the interior thereof, and grooves 32 each having substantially semispherical opposite ends and a substantially semi-cylindrical middle portion 32 and substantially semi-spherical hollows 35 are obtained as illustrated by the dotted lines in FIG. 3.

Next, after the mask film 30 has been removed by etching, the middle portion of the inner wall surface of each of the grooves 32 except the opposite semi-spherical portions is coated with a black paint 3 so as to form the photo-absorptive surface.

In order to coat the black paint on the limited specific area as described above, for example, a photo resist is provided with a pattern by a conventional photo lithography technique, then the whole surface is coated with the black paint, and then the photo resist is removed so the black paint remains only at the necessary portions.

A pair of substrates having grooves and hollows produced in such a manner as described above are positioned opposite each other so that the grooves 32 and the hollows 35 of one of the grooved substrates are made to accord with the corresponding grooves 32 and the hollows 35 of the other of the grooved substrates, respectively. The pair of substrates are positioned accurately against each other and bonded to each other using an adhesive agent. The adhesive agent is transparent after hardening and has a refractive index higher than that of the substrate 40.

At this time, the grooves 32 and the hollows 35 are filled with the adhesive agent before bonding so that the adhesive agent becomes the transparent material filled in the photo-transmissible holes 2 in the image transmitting element 100. After the adhesive agent has hardened, the joined body is cut along cutting lines 33 perpendicular to the row of grooves at a longitudinally central position of the grooves or crossing the center of the row of the hollows 35.

Each of elongated pieces as shown in FIG. 5 cut through the method described above is the image transmitting element 100 according to the present invention.

Although one embodiment has been described above, the present invention is not limited to the above embodiment but various modifications are possible. For example, it is possible that each of the grooves 32 and the hollows 35 of a pair of substrates is previously filled with a transparent material having a high refractive index (e.g., glass, resins), the surface of the filled transparent material is made flat by polishing, and then the pair of substrates are joined to each other. Further, after the joined body of the substrates is cut along the cutting lines, the cut surfaces of the joined substrate may be mirror-polished to improve the smoothness of the surfaces, or the cut surfaces may be coated with a transparent coating film such as a sol-gel film, a resin film, or the like, to make the surfaces smooth, without performing mirror-polishing.

In the case where the image transmitting element 100 is integrally bonded to the contact sensor 4 for use, it is preferred that the thermal expansion coefficients of the substrate materials of the image transmitting element 100 and the contact sensor 4 are the same as or substantially the same.

For example, if the contact sensor 4 is made of #7059 glass (a trademark of Corning Co.) or quartz glass as its substrate, it is preferred that the same material be selected as the substrate material 1 of the image transmitting element 100.

However, if high accuracy is not necessary, a transparent resin material (e.g., UV or heat curable acrylic resin, polymethyl methacrylate, polycarbonate) may be used as the image transmitting element 100.

It is not always necessary to coat the entire length of photo-transmissible holes 2 with the photo-absorptive coating film 3, and, for example, there is a case where it is sufficient if only about 60% to 80% of the are of the whole length of the holes is coated.

It is not always necessary that the substantially semi-spherical surfaces 21 and 22 having the light focusing function of the photo-transmissible holes be accurately semi-spherical so long as the surfaces 21 and 22 have the effect of bending light inward of the photo-transmissible hole by refraction. That is, the surfaces 21 and 22 may be a shape of a curved surface constituting a part of a sphere, a paraboloid of revolution, a hyperboloid of revolution, or the like, or a polyhedron such as a trapezoid.

Although FIGS. 1 and 2 show that the surface 21 accurately focuses an original document surface onto a sensor element of a contact sensor, it is sufficient if reflected light from the original document surface is incident into the area of the sensor element.

Although the case where the image transmitting element 100 according to the present invention is combined with the contact sensor has been described in the above embodiment, the image transmitting element 100 may be combined with an LED array in place of the contact sensor to thereby constitute an optical system of an LED printer or combined with a liquid crystal shutter array to thereby constitute an optical system of a liquid crystal printer.

Figure 6:
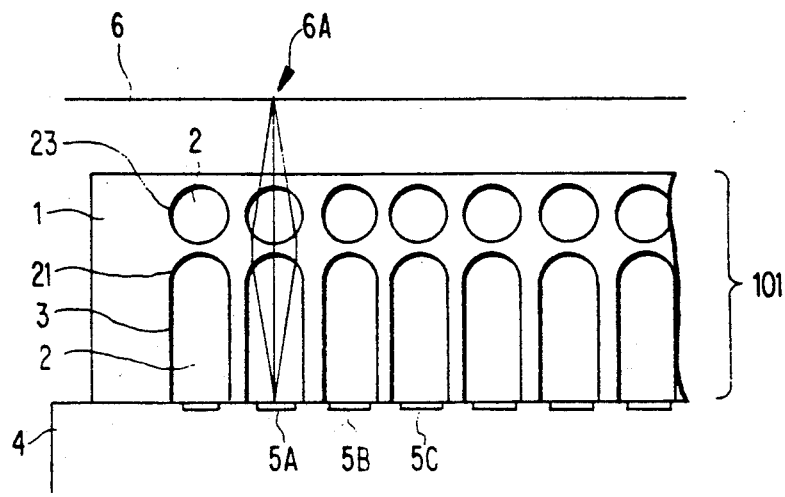
FIG. 6 is a vertical section showing the image transmitting element according to another embodiment of the present invention.

According to another embodiment of the present invention, each of the photo-transmissible holes 2 may be constituted by a substantially cylindrical hole having a substantially semi-spherical upper surface 21 and a substantially spherical surface 23 disposed above the substantially cylindrical hole 21, as shown in FIG. 6. All the holes are filled with a transparent material, such as resin or the like, having a refractive index higher than that of a glass substrate 1. In this embodiment, light reflected from an original document surface 6 is refracted twice by the substantially spherical surface 23, further refracted by the substantially semi-spherical surface 21, that is, the upper surface of the substantially cylindrical hole, and then incident into the corresponding one of the sensor elements 5 of the sensor array. Therefore, the focusing effect of this embodiment is larger than that of the embodiment shown in FIG. 1.

Figure 7:
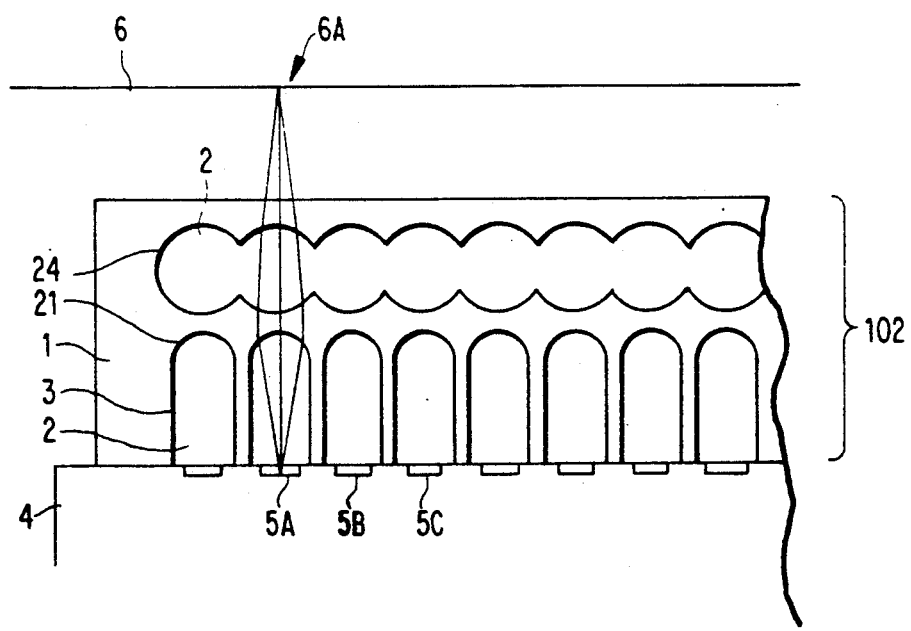
FIG. 7 is a vertical section showing the image transmitting element according to still another embodiment of the present invention.

Moreover, according to still another embodiment of the present invention, a substantially spherical surface 24 disposed above the substantially cylindrical hole of each of the photo-transmissible holes 2 may be formed so as to continue with adjacent substantially spherical surfaces as shown in FIG. 7. Generally, if the radius of curvature of a spherical surface decreases, the spherical aberration increases. If the radius of curvature is selected to have a large value as in this embodiment, a suitable focusing distance can be obtained with relatively low aberration.

Figure 8:
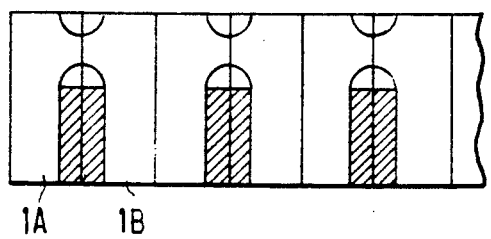
FIG. 8 is view for explaining one embodiment of the image transmitting element according to the present invention in which the photo-transmissible holes are formed two-dimensionally.
Figure 9:
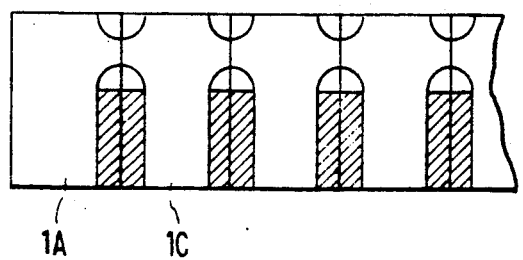
FIG. 9 is view for explaining another embodiment of the image transmitting element according to the present invention in which the photo-transmissible holes are formed two-dimensionally.

The image transmitting element according to the present invention in which the photo-transmissible holes are formed two-dimensionally as an array can be produced in the manner described in FIGS. 8 and 9 but is not restricted thereto.

In one embodiment shown in FIG. 8, a number of image transmitting elements each composed of a pair of members 1A and 1B produced by the above-described process are stacked along the longitudinal direction thereof to form a two-dimensional array of the photo-transmissible holes.

In another embodiment shown in FIG. 9, the image transmitting element is composed of a member having grooves on one surface thereof 1A and a number of members each having grooves on both surfaces thereof 1C. In this embodiment, the intervals of the photo-transmitting holes can be reduced in comparison to the embodiment shown in FIG. 8.

By use of the image transmitting element according to the present invention, it is possible to make an optical system such as a contact type image sensor, an LED printer and the like extremely small. For example, the distance between an original document surface and a light sensor surface becomes about 0.6 to 2.0 mm.

At this time, even if there is a gap about not more than 1 mm between the original document surface and the image transmitting element, since light traveling in the direction toward the adjacent picture elements is intercepted by the photo-absorptive surfaces of the inner walls of the respective photo-transmissible holes in the image transmitting element, there is no fading of an image signal due to cross talk so that a clear image of high resolution can be obtained. That is, there are advantages that the depth of focus can be made comparatively large and that the surface is not injured due to contact with the element.

Moreover, although in a perfect contact type image sensor, the size of illuminating light leading windows corresponding to respective picture elements cannot be made large for the sake of maintaining resolution so that the transmitting efficiency of the illumination to an original document surface becomes low, there is not such a limitation in the image transmitting element according to the present invention, and for example, as shown in the embodiment in FIG. 2, it is possible to lead illuminating light to an original document from the back side of the image transmitting element 100 and the contact sensor 4 efficiently, so that it is possible to improve the utilization efficiency of illumination.

Further, according to the present invention, there is an advantage in that since the plural substantially spherical surfaces for performing light focusing as a convex lens are provided, a large light focusing effect can be obtained compared with the case of providing a single substantially spherical surface and the distance between an original document surface and a sensor surface can be reduced to thereby make it possible to reduce the optical system in size. Moreover, there is an advantage in that the efficiency of transmission of light from an original document surface to a sensor surface can be improved because the numerical aperture (NA) can be increased.

Furthermore, since required focusing power can be divided to the plural substantially spherical surfaces, it is not necessary to bend the light rays greatly at each of the surfaces, and therefore it is not always necessary to use a transparent material filled in the photo-transmissible holes having a large difference in refractive index relative to the substrate. Consequently, there is an advantage in that a wide selection of filler material can be utilized.

While the invention has been described in detail and with reference to specific examples thereof, it will be apparent to one skilled in the art that various changes and modifications can be made therein without departing from the spirit and scope thereof.

What is claimed is:

1. An image transmitting element comprising:
   a transparent substrate having a flat upper surface and a flat lower surface;
   photo-transmissible holes formed as an array in said substrate, each of said holes having an open end on the lower surface of said substrate, a closed end proximal the upper surface of said substrate, and a substantially cylindrical side surface, said closed ends forming substantially semi-spherical surfaces;
   a lens having a substantially spherical or semi-spherical surface, said lens being positioned in said substrate between the closed end of each photo-transmissible hole and the upper surface of said substrate;
   a photo-absorptive surface formed on at least a part of said cylindrical side surface of said photo-transmissible holes; and
   a transparent material with which said photo-transmissible holes are filled, said transparent material having a refractive index higher than that of said substrate.

2. An image transmitting element as claimed in claim 1 wherein said image transmitting element is affixed to a contact sensor with an adhesive agent.

3. An image transmitting element as claimed in claim 2 wherein said contact sensor includes a sensor array comprising a plurality of sensor elements, said elements being aligned in one to one correspondence with said photo-transmissible holes.

4. An image transmitting element as claimed in claim 3 wherein said sensor element array is formed on a photo shield layer.

5. An image transmitting element as claimed in claim 1 wherein said image transmitting element is affixed to an LED array with an adhesive agent, said LED array comprising a plurality of LED elements aligned in one to one correspondence with said photo-transmissible holes.

6. An image transmitting element as claimed in claim 1 wherein said lens is substantially spherical and disposed above said photo-transmissible hole.

7. An image transmitting element as claimed in claim 1 wherein the substantially spherical or semi-spherical surfaces of said lenses are contiguous.

* * * * *